United States Patent [19]
Taylor

[11] Patent Number: 5,440,442
[45] Date of Patent: Aug. 8, 1995

[54] APPARATUS AND METHOD TO DETERMINE CAPACITANCE REQUIRED TO OPTIMIZE POWER FACTOR

[76] Inventor: Gregory G. Taylor, 610 Moonpenny Cir., Port Orange, Fla. 32127

[21] Appl. No.: 24,240

[22] Filed: Mar. 1, 1993

[51] Int. Cl.⁶ .............................................. G05F 1/70
[52] U.S. Cl. ...................................... 361/93; 361/15; 361/17
[58] Field of Search ................ 361/93, 15, 16, 17; 323/210, 119; 307/34, 38

[56] References Cited

U.S. PATENT DOCUMENTS 4,317,076 2/1982 Price ..................................... 323/210

Primary Examiner—Marc S. Hoff
Assistant Examiner—S. Jackson
Attorney, Agent, or Firm—Paul S. Rooy

[57] ABSTRACT

An apparatus and method for optimizing power factor in single phase and three phase installations. Capacitor circuits are interruptably connected with busses by means of switches. Leads electrically connected to the busses are attached to the load leads. The correct capacitance to optimize the power factor is determined experimentally by closing the switches, singly and in combination, until the power factor is in the 95-98% range. A power factor meter is used to determine power factor.

14 Claims, 3 Drawing Sheets

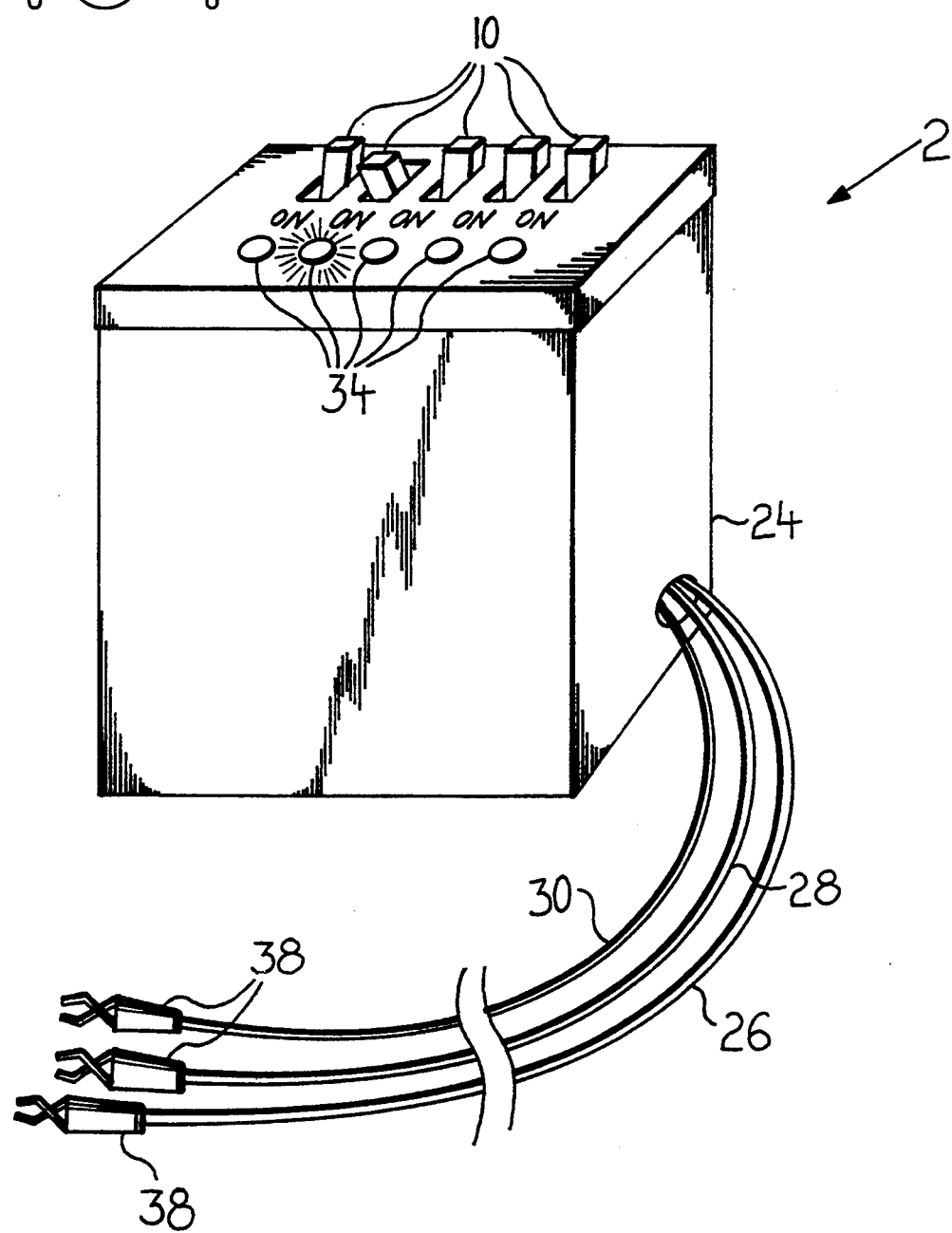

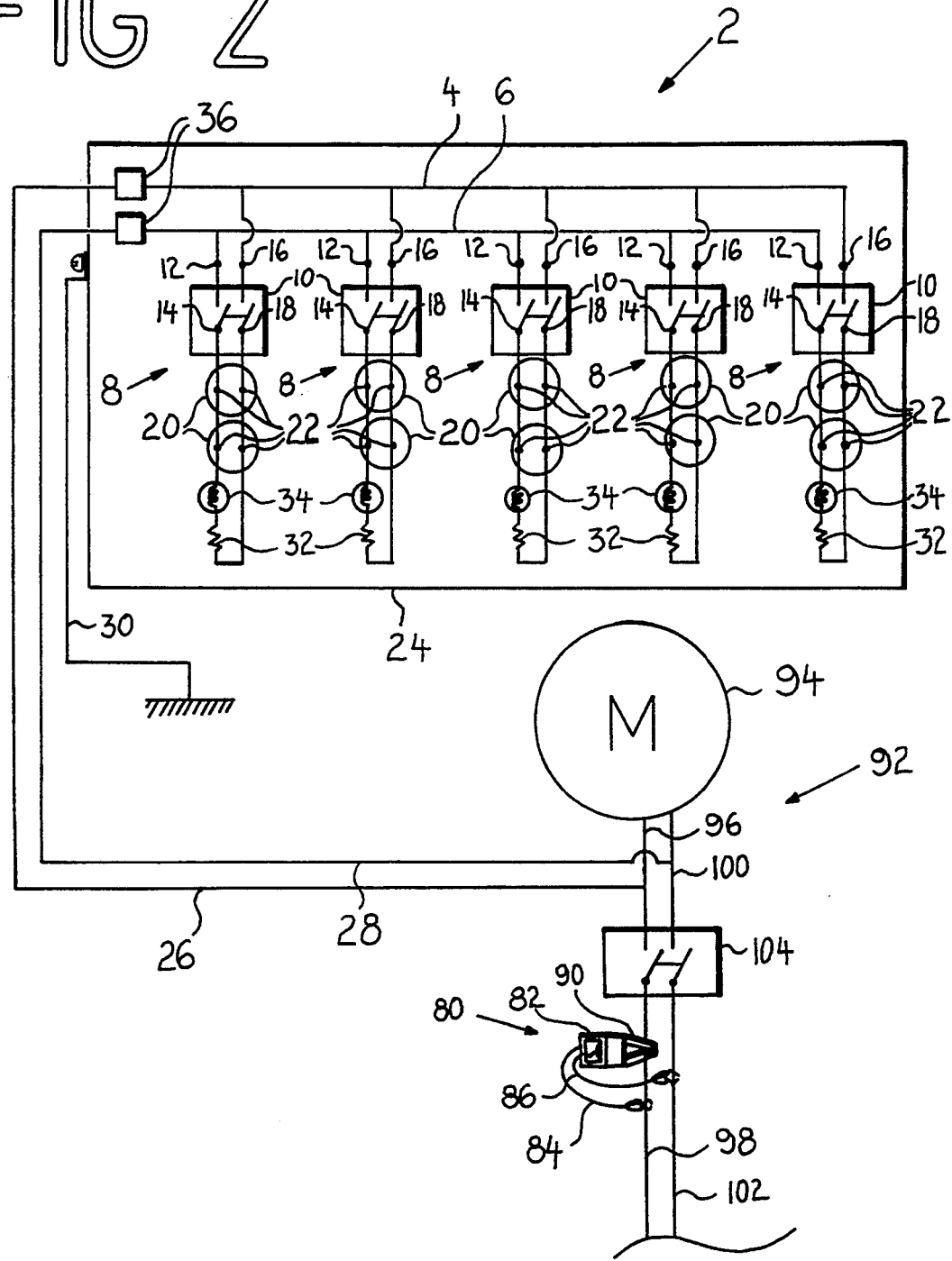

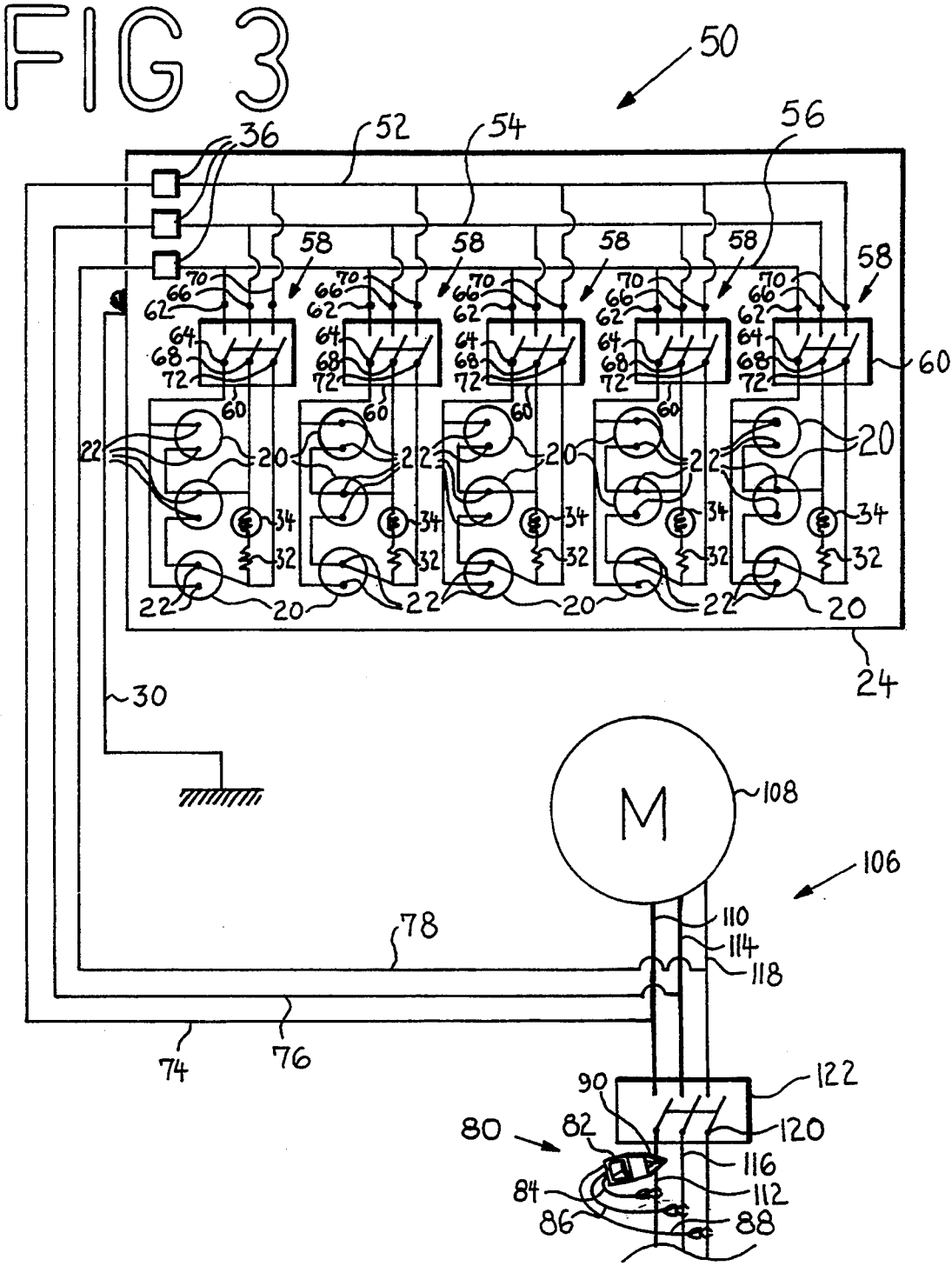

APPARATUS AND METHOD TO DETERMINE CAPACITANCE REQUIRED TO OPTIMIZE POWER FACTOR

BACKGROUND OF THE INVENTION

1. Field of the Invention

The instant invention relates to apparatus for optimizing power factor in electrical installations, and in particular to a KVAR sizing unit and method of use for determining the capacitance to connect to a given load in order to optimize power factor.

2. Background of the Invention

The loads served by electric utility companies are generally primarily resistive (such as incandescent light bulbs) or primarily inductive (such as induction motors). The inductive loads draw a combination of kilowatts (real power) and kilovars (reactive power). Capacitors are a static source of kilovars.

Capacitors installed at inductive loads provide a number of benefits: reduced electrical energy consumption, reduced line current, increased voltage at the load, better voltage regulation and lower losses. These benefits are accomplished by installing sufficient capacitor kilovars (KVAR) at the load to bring power factor to just under unity. Power factor is equal to real power (kilowatts) divided by reactive power (kilovars).

Additional benefits associated with the optimization of power factor at an inductive load include increased equipment life due to lower operating temperature, protection against electrical surges such as those caused by lightning, and increased capacity at the electrical panel.

Inductive equipment that would benefit from power factor optimization include air conditioners, heat pumps, refrigeration equipment, irrigation pumps, pool pumps, etc. In small residential installations, the power factor of the entire house may be optimized at the house's circuit breaker panel. In large residential, commercial and industrial settings the power factor of individual components may be optimized at the component's location at the load side of the component's switching device. Examples of this larger type of inductive equipment include air conditioners, refrigeration equipment and chillers, amonia systems used in refrigeration systems, commercial washers and dryers, irrigation pumps (in the agricultural area), conveyers, etc.

Unfortunately, capacitors are not used to optimize load factor as widely as they might be. One reason for this has been the lack of a simple apparatus and method to optimize load factor. Utility company engineers have the technical background to size capacitors to correct load factor for electric utility companies, but in general, no such capability exists in the residential, commercial, industrial and agricultural areas. As a result, more electrical energy than is necessary is used to power inductive loads.

SUMMARY OF THE INVENTION

Accordingly, it is an object of this invention to provide an apparatus and method of use to determine capacitance required to optimize power factor in single phase installations. Invention features allowing the accomplishment of this object include a single phase KVAR sizing unit and a simple method of use. Advantages associated with the achievement of this object include reduced electrical consumption and cost, and prolonged equipment life.

It is another object of this invention to provide an apparatus and method of use to determine capacitance required to optimize power factor in three phase installations. Invention features allowing the accomplishment of this object include a three phase KVAR sizing unit and a simple method of use. Advantages associated with the achievement of this object include reduced electrical consumption and cost, and prolonged equipment life.

It is still another object of the present invention to provide a an apparatus and method of use to optimize power factor whereby the required capacitance is easily and quickly determined. Invention features allowing this object to be achieved include a simple method of use and design features including easily accessed two position switches and clear indicator lights. Advantages associated with the accomplishment of this object include reduced costs and less sizing errors.

Another object of the present invention is to provide an apparatus and method of use to determine capacitance required to optimize power factor which is made of readily available, off the shelf materials so as to minimize cost and maximize availability.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIG. 1, sheet two contains FIG. 2 and sheet three contains FIG. 3.

FIG. 1 is a front isometric view of a single phase KVAR sizing unit.

FIG. 2 is an electrical schematic of a single phase KVAR sizing unit with power factor meter being used to optimize load factor for a single phase load.

FIG. 3 is an electrical schematic of a three phase KVAR sizing unit with power factor meter being used to optimize load factor for a three phase load.

DETAILED DESCRIPTION OF THE PREFERRED EMBODIMENT

FIG. 1 is a front isometric view of single phase KVAR sizing unit 2. Two pole, two position ganged switches 10 electrically connect and disconnect capacitors 20 to and from the electrical load whose power factor is being optimized. First single phase lead 26, second phase lead 28 and ground lead 30, all terminating in clips 38, are ready to be attached. Most single phase KVAR sizing unit 2 components are contained within enclosure 24.

FIG. 2 is an electrical schematic of single phase KVAR sizing unit 2 being used in conjunction with power meter 80 to optimize the load factor of single phase load 92.

Single phase KVAR sizing unit 2 comprises a a first single phase bus 4 and a second single phase bus 6 electrically connected to a plurality of single phase capacitor circuits 8. Each single phase capacitor circuit 8 comprises a two pole, two position ganged switch 10 having a first single phase bus-side terminal 12 electrically connected to first single phase bus 4 and interruptably connected to first single phase capacitor-side terminal 14, and a second single phase bus-side terminal 16 electrically connected to second single phase bus 6 and interruptably connected to second single phase capacitor-side terminal 18. Each capacitor 20 has two capacitor terminals 22, one of which is electrically connected to first single phase capacitor-side terminal 14 and the other of which is electrically connected to second single phase capacitor-side terminal 18.

Resistor 32 and light 34 may be connected electrically in series between first single phase capacitor-side terminal 14 and second single phase capacitor-side terminal 18, thereby allowing light 34 to illuminate when its two pole, two position ganged switch 10 is closed where single phase KVAR sizing unit 2 is in use. This provides a visual indication of switch position. In addition, resistor 32 and light 34 serve to discharge capacitors 20 after they are disconnected from the load whose load factor is being optimized.

An overload protection device 36 may be electrically connected between first single phase bus 4 and first single phase lead 26 whereby first single phase bus 4 may be electrically isolated from first single phase lead 26 in case of an overload condition in first single phase lead 26. An overload protection device 36 may also be electrically connected between second single phase bus 6 and second single phase lead 28 whereby second single phase bus 6 may be electrically isolated from second single phase lead 28 in case of an overload condition in second single phase lead 28.

In the preferred embodiment there were five single phase capacitor circuits 8, the capacitance value installed in each of the five single phase capacitor circuits 8 being, respectively: 28 microfarads, 80 microfarads, 120 microfarads, 120 microfarads and 160 microfarads. Each overload protection device 36 was a 30 amp circuit breaker. Enclosure 24 was made of metal and clips 38 were electrical alligator clips with rubber insulation boots.

FIG. 3 is an electrical schematic of three phase KVAR sizing unit 50 being used with power factor meter 80 to optimize the power factor in three phase load 106. Three phase KVAR sizing unit 50 is comprised of a plurality of three phase capacitor circuits 58 electrically connected to a first three phase bus 52, a second three phase bus 54 and a third three phase bus 56, the buses being electrically connected to first three phase lead 74, second three phase lead 76 and third three phase lead 78 respectively. Ground lead 30 is attached to enclosure 24, which contains buses 52, 54 and 56 and three phase capacitor circuits 58.

Each three phase capacitor circuit 58 is comprised of a three pole, two position ganged switch 60 and a plurality of capacitors 20. Three pole, two position ganged switch 60 comprises a first three phase bus-side terminal 62 electrically connected to first three phase bus 52 and interruptably connected to first three phase capacitor-side terminal 64, a second three phase bus-side terminal 66 electrically connected to second three phase bus 54 and interruptably connected to second three phase capacitor-side terminal 68, and a third three phase bus-side terminal 70 electrically connected to third three phase bus 56 and interruptably connected to third three phase capacitor-side terminal 72.

At least one capacitor 20 having two terminals 22 is electrically connected between first three phase capacitor-side terminal 64 and second three phase capacitor-side terminal 68. At least one capacitor 20 having two terminals 22 is electrically connected between second three phase capacitor-side terminal 68 and third three phase capacitor-side terminal 72. At least one capacitor 20 having two terminals 22 is electrically connected between third three phase capacitor-side terminal 72 and first three phase capacitor-side terminal 68.

Resistor 32 and light 34 may be electrically connected in series between second three phase capacitor-side terminal 68 and third three phase capacitor-side terminal 72. When three phase KVAR sizing unit 50 is in use, an illuminated light 32 signals the three pole, two position ganged switch is open in the three phase capacitor circuit 58 in which light 34 is located. Resistor 32 and light 34 also serve to bleed down capacitor charge.

First three phase lead 74, second three phase lead 76 and third three phase lead 78 may terminate in clips 38 as depicted in FIG. 1.

An overload protection device 36 may be electrically connected between first three phase lead 74 and first three phase bus 52, between second three phase lead 76 and second three phase bus 54, and between third three phase lead 78 and third three phase bus 56.

In the preferred embodiment there were five three phase capacitor circuits 58, the capacitance value installed between capacitor-side terminals 64 and 68, 68 and 72, and 72 and 64 in these five circuits being, respectively: 38 microfarads, 60 microfarads, 80 microfarads, 80 microfarads, and 80 microfarads. Each overload protection device 36 was a 30 amp circuit breaker. Enclosure 24 was made of metal and clips 38 were electrical alligator clips with rubber insulation boots.

Operation of Single Phase KVAR Sizing Unit 2

FIG. 2 shows single phase KVAR sizing unit 2 being used in conjunction with a power factor meter 80 to optimize the power factor in a single phase load 92.

Power factor meter 80 comprises a first power factor meter lead 84, a second power factor meter lead 86, a jaw 90 and an indicator 82 that reads from 0–100% power factor.

Single phase load 92 comprises a single phase induction motor 94 and a single phase disconnect switch 104, by means of which first single phase load-side lead 96 is interruptably connected to first single phase line-side lead 98, and by means of which second single phase load-side lead 100 is interruptably connected to second single phase line-side lead 102.

The method of use for single phase KVAR sizing unit 2 is as follows:

A. WARNING! AS WITH ALL ELECTRICAL EQUIPMENT CAUTION MUST BE EXERCISED TO PREVENT ELECTRICAL SHOCK!;
B. open single phase disconnect switch 104 and all two pole, two position ganged switches 10;
C. electrically connect first single phase lead 26 to first single phase load-side lead 96;
D. electrically connect second single phase lead 28 to second single phase load-side lead 100;
E. electrically connect ground lead 30 to an electrical ground;
F. electrically connect first power factor meter lead 84 to first single phase line-side lead 98;
G. electrically connect second power factor meter lead 86 to second single phase line-side lead 102;
H. clamp jaw 90 around first single phase line-side lead 98;
I. close single phase disconnect switch 104;
J. read power factor meter 80—the reading may be in the 70–90% power factor range; our object is to optimize the power factor to 95–98%;

K. starting with the least capacitance value single phase capacitance circuit 8, progressively add capacitance by closing the two pole, two position ganged switches 10 singly and in combination;

L. check the power factor using power factor meter 80 after each increase in capacitance;

M. when the power factor falls into the optimum range (95–98%) record the capacitance; this is the capacitance required to optimize power factor for single phase load 92.

Operation of Three Phase KVAR Sizing Unit 50

FIG. 3 shows three phase KVAR sizing unit 50 being used in conjunction with power factor meter 80 to optimize the power factor in three phase load 106.

Power factor meter 80 comprises first power factor meter lead 84, second power factor meter lead 86, third power factor meter lead 88, jaw 90 and indicator 82 that reads from 0–100% power factor.

Three phase load 106 comprises three phase induction motor 108 and three phase disconnect switch 122, by means of which first three phase load-side lead 110 is interruptably connected to first three phase line-side lead 112, by means of which second three phase load-side lead 114 is interruptably connected to second three phase line-side lead 116, and by means of which third three phase load-side lead 118 is interruptably connected to third three phase line-side lead 120.

The method of use for three phase KVAR sizing unit 50 is as follows:

A. WARNING! AS WITH ALL ELECTRICAL EQUIPMENT CAUTION MUST BE EXERCISED TO PREVENT ELECTRICAL SHOCK!;

B. open three phase disconnect switch 122 and all three pole, two position ganged switches 60;

C. electrically connect first three phase lead 74 to first three phase load-side lead 110;

D. electrically connect second three phase lead 76 to second three phase load-side lead 114;

E. electrically connect third three phase lead 78 to third three phase load-side lead 118;

F. electrically connect ground lead 30 to an electrical ground;

G. electrically connect first power factor meter lead 84 to first three phase line-side lead 112;

H. electrically connect second power factor meter lead 86 to second three phase line-side lead 116;

I. electrically connect third power factor meter lead 88 to third three phase line-side lead 120;

J. clamp jaw 90 around first three phase line-side lead 112;

K. close three phase disconnect switch 122;

L. read power factor meter 80—the reading may be in the 70–90% power factor range; our object is to optimize the power factor to 95–98%

M. starting with the least capacitance value three phase capacitance circuit 58, progressively add capacitance by closing three pole, two position ganged switches 60 singly and in combination;

N. check the power factor using power factor meter 80 after each increase in capacitance;

O. when the power factor falls into the optimum range (95–98%), record the capacitance; this is the capacitance required to optimize power factor for three phase load 106.

While a preferred embodiment of the invention has been illustrated herein, it is to be understood that changes and variations may be made by those skilled in the art without departing from the spirit and scope of the appending claims.

DRAWING ITEM INDEX 2 single phase KVAR sizing unit
4 first single phase bus
6 second single phase bus
8 single phase capacitor circuit
10 two pole, two position ganged switch
12 first single phase bus-side terminal
14 first single phase capacitor-side terminal
16 second single phase bus-side terminal
18 second single phase capacitor-side terminal
20 capacitor
22 capacitor terminal
24 enclosure
26 first single phase lead
28 second single phase lead
30 ground lead
32 resistor
34 light
36 overload protection device
38 clip
50 three phase KVAR sizing unit
52 first three phase bus
54 second three phase bus
56 third three phase bus
58 three phase capacitor circuit
60 three pole, two position ganged switch
62 first three phase bus-side terminal
64 first three phase capacitor-side terminal
66 second three phase bus-side terminal
68 second three phase capacitor-side terminal
70 third three phase bus-side terminal
72 third three phase capacitor-side terminal
74 first three phase lead
76 second three phase lead
78 third three phase lead
80 power factor meter
82 indicator
84 first power factor meter lead
86 second power factor meter lead
88 third power factor meter lead
90 jaw
92 single phase load
94 single phase induction motor
96 first single phase load-side lead
98 first single phase line-side lead
100 second single phase load-side lead
102 second single phase line-side lead
104 single phase disconnect switch
106 three phase load
108 three phase induction motor
110 first three phase load-side lead
112 first three phase line-side lead
114 second three phase load-side lead
116 second three phase line-side lead
118 third three phase load-side lead
120 third three phase line-side lead
122 three phase disconnect switch

I claim:

1. A single phase KVAR sizing unit comprising:
a first single phase bus;
a second single phase bus;
a plurality of single phase capacitor circuits, each said single phase capacitor circuit comprising:
a two pole, two position ganged switch comprising a first single phase bus-side terminal electrically connected to said first single phase bus and interruptably connected to a first single phase capacitor-side terminal, and a second single phase bus-side terminal electrically connected to said second single phase bus and interruptably connected to a second single phase capacitor-side terminal;

a plurality of capacitors, each said capacitor having two capacitor terminals, each said capacitor having one of its said capacitor terminals electrically connected to said first single phase capacitor-side terminal and the other of its said capacitor terminals electrically connected to said second single phase capacitor-side terminal;

an enclosure containing said first single phase bus, said second single phase bus and said single phase capacitor circuits;

a first single phase lead electrically connected to said first single phase bus, a second single phase lead electrically connected to said second single phase bus, and a ground lead electrically attached to said enclosure;

an overload protection device electrically connected between said first single phase bus and said first single phase lead whereby said first single phase bus may be electrically isolated form said first single phase lead in the presence of an electrical overload in said first single phase lead; and an overload protection device electrically connected between said second single phase bus and said second single phase lead whereby said second single phase bus may be electrically isolated from said second singe phase lead in the presence of an electrical overload in said second single phase lead.

2. The single phase KVAR sizing unit of claim 1 wherein each said single phase capacitor circuit further comprises a resistor and a light connected electrically in series between said first single phase capacitor-side terminal and said second single phase capacitor-side terminal.

3. The single phase KVAR sizing unit of claim 2 further comprising:
a clip electrically connected to the end of said first single phase lead which is not connected to one said overload protecion device;
a clip electrically connected to the end of said second single phase lead which is not connected to one said overload protecion device; and
a clip electrically connected to the end of said ground lead which is not connected to said enclosure.

4. The single phase KVAR sizing unit of claim 3 wherein there are five said single phase capacitor circuits, the capacitance value installed in each said five single phase capacitance circuits being, respectively: 28 microfarads, 80 microfarads, 120 microfarads, 120 microfarads and 160 microfarads.

5. The single phase KVAR sizing unit of claim 4 wherein each said overload protection device is a 30 amp circuit breaker.

6. A three phase KVAR sizing unit comprising:
a first three phase bus;
a second three phase bus;
third three phase bus;
a plurality of three phase capacitor circuits, each said three phase capacitor circuits comprising:
a three pole, two position ganged switch comprising a first three phase bus-side terminal electrically connected to said first three phase bus and interruptably connected to a first three phase capacitor-side terminal, a second three phase bus-side terminal electrically connected to said second three phase bus and interruptably connected to a second three phase capacitor-side terminal, and a third three phase bus-side terminal electrically connected to said third three phase bus and interruptably connected to a third three phase capacitor-side terminal;

at least one capacitor having two capacitor terminals, each said capacitor having one of its said capacitor terminals electrically connected to said first three phase capacitor-side terminal and its other said capacitor terminal electrically connected to said second three phase capacitor-side terminal;

at least one capacitor having two capacitor terminals, each said capacitor having one of its said capacitor terminals electrically connected to said second three phase capacitor-side terminal and its other said capacitor terminal electrically connected to said third three phase capacitor-side terminal;

at least one capacitor having two capacitor terminals, each said capacitor having one of its said capacitor terminals electrically connected to said third three phase capacitor-side terminal and its other said capacitor terminal electrically connected to said first three phase capacitor-side terminal;

an enclosure containing said first three phase bus, said second three phase bus, said third three phase bus and said three phase capacitor circuits;

a first three phase lead electrically connected to said first three phase bus;

a second three phase lead electrically connected to said second three phase bus;

a third three phase lead electrically connected to said third three phase bus;

a ground lead electrically connected to said enclosure;

an overload protection device electrically connected between said first three phase lead and said first three phase bus whereby said first three phase bus may be electrically isolated from said first three phase lead in the presence of an electrical overload in said first three phase lead;

an overload protection device electrically connected between said second three phase lead and said second three phase bus whereby said second three phase bus may be electrically isolated from said second three phase lead in the presence of an electrical overload in said second three phase lead, and an overload protection device electrically connected between said third three phase lead and said third three phase bus whereby said third three phase bus may be electrically isolated from said third three phase lead in the presence of an electrical overload in said third three phase lead.

7. The three phase KVAR sizing unit of claim 6 wherein each said three phase capacitor circuit further comprises a resistor and a light electrically connected in series between said second three phase capacitor-side terminal and said third three phase capacitor-side terminal.

8. The three phase KVAR sizing unit of claim 7 further comprising:

a clip electrically connected to the end of said first three phase lead not connected to one said load protection device;

a clip electrically connected to the end of said second three phase lead not connected to one said load protection device;

a clip electrically connected to the end of said third three phase lead not connected to one said load protection device; and a clip electrically connected to the end of said ground lead not connected to said enclosure.

9. The three phase KVAR sizing unit of claim 8 wherein there are five said three phase capacitor circuits, and the capacitance value of the said capacitors installed in each said three phase capacitor circuit is, respectively:

38 microfarads between said first three phase capacitor-side terminal and said second three phase capacitor-side terminal, 38 microfarads between said second three phase capacitor-side terminal and said third three phase capacitor-side terminal and 38 microfarads between said third three phase capacitor-side terminal and said first three phase capacitor-side terminal;

60 microfarads between said first three phase capacitor-side terminal and said second three phase capacitor-side terminal, 60 microfarads between said second three phase capacitor-side terminal and said third three phase capacitor-side terminal and 60 microfarads between said third three phase capacitor-side terminal and said first three phase capacitor-side terminal;

80 microfarads between said first three phase capacitor-side terminal and said second three phase capacitor-side terminal, 80 microfarads between said second three phase capacitor-side terminal and said third three phase capacitor-side terminal and 80 microfarads between said third three phase capacitor-side terminal and said first three phase capacitor-side terminal;

80 microfarads between said first three phase capacitor-side terminal and said second three phase capacitor-side terminal, 80 microfarads between said second three phase capacitor-side terminal and said third three phase capacitor-side terminal and 80 microfarads between said third three phase capacitor-side terminal and said first three phase capacitor-side terminal; and 80 microfarads between said first three phase capacitor-side terminal and said second three phase capacitor-side terminal, 80 microfarads between said second three phase capacitor-side terminal and said third three phase capacitor-side terminal and 80 microfarads between said third three phase capacitor-side terminal and said first three phase capacitor-side terminal.

10. The three phase KVAR sizing unit of claim 9 wherein each said overload protection device is a 30 amp circuit breaker.

11. A method of use for a single phase KVAR sizing unit and power factor meter to determine the capacitance required to optimize power factor for a single phase load, said single phase sizing unit comprising:

a first single phase bus;

a second single phase bus;

a plurality of single phase capacitor circuits, each said single phase capacitor circuit comprising:

a two pole, two position ganged switch comprising a first single phase bus-side terminal electrically connected to said first single phase bus and interruptably connected to a first single phase capacitor-side terminal, and a second single phase bus-side terminal electrically connected to said second single phase bus and interruptably connected to a second single phase capacitor-side terminal;

a plurality of capacitors, each said capacitor having two capacitor terminals, each said capacitor having one of its said capacitor terminals electrically connected to said first single phase capacitor-side terminal and the other of its said capacitor terminals electrically connected to said second single phase capacitor-side terminal;

an enclosure containing said first single phase bus, said second single phase bus and said single phase capacitor circuits; and a first single phase lead electrically connected to said first single phase bus, a second single phase lead electrically connected to said second single phase bus, and a ground lead electrically attached to said enclosure;

said power factor meter comprising a power factor indicator which reads against a scale of at least 0–100% power factor, a first power factor meter lead, a second power factor meter lead, and a jaw;

said single phase load comprising:

a first single phase load-side lead interruptably connected to a first single phase line-side lead by means of a single phase disconnect switch; and a second single phase load-side lead interruptably connected to a second single phase line-side lead by means of said single phase disconnect switch;

said method for use for a single phase KVAR sizing unit and power factor meter to determine the capacitance required to optimize power factor for a single phase load comprising the following steps:

A. open said single phase disconnect switch and all said two pole, two position ganged switches;

B. electrically connect said first single phase lead to said first single phase load-side lead;

C. electrically connect said second single phase lead to said second single phase load-side lead;

D. electrically connect said ground lead to an electrical ground;

E. electrically connect said first power factor meter lead to said first single phase line-side lead;

F. electrically connect said second power factor meter lead to said second single phase line-side lead;

G. clamp said jaw around said first single phase line-side lead;

H. close said single phase disconnect switch;

I. read power factor meter—the reading may be in the 70–90% power factor range; our object is to optimize the power factor to 95–98%;

J. starting with the least capacitance value single phase capacitance circuit, progressively add capacitance by closing said two pole, two position ganged switches singly and in combination;

K. check the power factor using said power factor meter after each increase in capacitance;

L. when the power factor falls into the optimum range (95–98%) record the capacitance; this is the capacitance required to optimize power factor for said single phase load.

12. A method of use for a three phase KVAR sizing unit and power factor meter to determine the capacitance required to optimize power factor for a three phase load, said three phase KVAR sizing unit comprising:

a first three phase bus;
a second three phase bus;
a third three phase bus;
a plurality of three phase capacitor circuits, each said three phase capacitor circuits comprising:
a three pole, two position ganged switch comprising a first three phase bus-side terminal electrically connected to said first three phase bus and interruptably connected to a first three phase capacitor-side terminal, a second three phase bus-side terminal electrically connected to said second three phase bus and interruptably connected to a second three phase capacitor-side terminal, and a third three phase bus-side terminal electrically connected to said third three phase bus and interruptably connected to a third three phase capacitor-side terminal;
at least one capacitor having two capacitor terminals, each said capacitor having one of its said capacitor terminals electrically connected to said first three phase capacitor-side terminal and its other said capacitor terminal electrically connected to said second three phase capacitor-side terminal;
at least one capacitor having two capacitor terminals, each said capacitor having one of its said capacitor terminals electrically connected to said second three phase capacitor-side terminal and its other said capacitor terminal electrically connected to said third three phase capacitor-side terminal;
at least one capacitor having two capacitor terminals, each said capacitor having one of its said capacitor terminals electrically connected to said third three phase capacitor-side terminal and its other said capacitor terminal electrically connected to said first three phase capacitor-side terminal;
an enclosure containing said first three phase bus, said second three phase bus, said third three phase bus and said three phase capacitor circuits;
a first three phase lead electrically connected to said first three phase bus;
a second three phase lead electrically connected to said second three phase bus;
a third three phase lead electrically connected to said third three phase bus; and
a ground lead electrically connected to said enclosure;
said power factor meter comprising a power factor indicator which reads against a scale of at least 0–100% power factor, a first power factor meter lead, a second power factor meter lead, a third power factor meter lead, and a jaw;
said three phase load comprising:
a first three phase load-side lead interruptably connected to a first three phase line-side lead by means of a three phase disconnect switch;
a second three phase load-side lead interruptably connected to a second three phase line-side lead by means of said three phase disconnect switch;
a third three phase load-side lead interruptably connected to a third three phase line-side lead by means of said three phase disconnect switch;
said method for use for a three phase KVAR sizing unit and power factor meter to determine the capacitance required to optimize power factor for a three phase load comprising the following steps:
A. open said three phase disconnect switch and all said three pole, two position ganged switches:
B. electrically connect said first three phase lead to said first three phase load-side lead;
C. electrically connect said second three phase lead to said second three phase load-side lead:
D. electrically connect said third three phase lead to said third three phase load-side lead;
E. electrically connect said ground lead to an electrical ground;
F. electrically connect said first power factor meter lead to said first three phase line-side lead;
G. electrically connect said second power factor meter lead to said second three phase line-side lead;
H. electrically connect said third power factor meter lead to said third three phase line-side lead;
I. clamp said jaw around said first three phase line-side lead;
J. close said three phase disconnect switch;
K. read power factor meter—the reading may be in the 70–90% power factor range; our object is to optimize the power factor to 95–98%;
L. starting with the least capacitance value three phase capacitance circuit, progressively add capacitance by closing said three pole, two position ganged switches singly and in combination;
M. check the power factor using said power factor meter after each increase in capacitance;
N. when the power factor falls into the optimum range (95–98%) record the capacitance; this is the capacitance required to optimize power factor for said three phase load.

13. A single phase KVAR sizing unit comprising:
a first single phase bus;
a second single phase bus;
a plurality of single phase capacitor circuits, each said single phase capacitor circuit comprising:
a two pole, two position ganged switch comprising a first single phase bus-side terminal electrically connected to said first single phase bus and interruptably connected to a first single phase capacitor-side terminal, and a second single phase bus-side terminal electrically connected to said second single phase bus and interruptably connected to a second single phase capacitor-side terminal;
a plurality of capacitors, each said capacitor having two capacitor terminals, each said capacitor having one of its said capacitor terminals electrically connected to said first single phase capacitor-side terminal and the other of its said capacitor terminals electrically connected to said second single phase capacitor-side terminal;
an enclosure containing said first single phase bus, said second single phase bus and said single phase capacitor circuits; and
a first single phase lead electrically connected to said first single phase bus, a second single phase lead electrically connected to said second single phase bus, and a ground lead electrically attached to said enclosure.

14. A three phase KVAR sizing unit comprising:
a first three phase bus;
a second three phase bus;
a third three phase bus;
a plurality of three phase capacitor circuits, each said three phase capacitor circuits comprising:
  a three pole, two position ganged switch comprising a first three phase bus-side terminal electrically connected to said first three phase bus and interruptably connected to a first three phase capacitor-side terminal, a second three phase bus-side terminal electrically connected to said second three phase bus and interruptably connected to a second three phase capacitor-side terminal, and a third three phase bus-side terminal electrically connected to said third three phase bus and interruptably connected to a third three phase capacitor-side terminal;
  at least one capacitor having two capacitor terminals, each said capacitor having one of its said capacitor terminals electrically connected to said first three phase capacitor-side terminal and its other said capacitor terminal electrically connected to said second three phase capacitor-side terminal;
  at least one capacitor having two capacitor terminals, each said capacitor having one of its said capacitor terminals electrically connected to said second three phase capacitor-side terminal and its other said capacitor terminal electrically connected to said third three phase capacitor-side terminal;
  at least one capacitor having two capacitor terminals, each said capacitor having one of its said capacitor terminals electrically connected to said third three phase capacitor-side terminal and its other said capacitor terminal electrically connected to said first three phase capacitor-side terminal;
an enclosure containing said first three phase bus, said second three phase bus, said third three phase bus and said three phase capacitor circuits;
a first three phase lead electrically connected to said first three phase bus;
a second three phase lead electrically connected to said second three phase bus;
a third three phase lead electrically connected to said third three phase bus; and
a ground lead electrically connected to said enclosure.

* * * * *